United States Patent [19]

Thompson

[11] 4,078,761
[45] Mar. 14, 1978

[54] ROTATIONAL CASTING MOLD

[76] Inventor: Raymond L. Thompson, 3608 Enfield Rd. NW., Canton, Ohio 44708

[21] Appl. No.: 724,952

[22] Filed: Sep. 20, 1976

[51] Int. Cl.$^2$ ............................. B29C 1/00; B29C 5/04
[52] U.S. Cl. .................................... 249/141; 249/205; 425/435
[58] Field of Search ............... 425/435, 305 B, 242 R, 425/542; 249/137, 141, 205

[56] References Cited

U.S. PATENT DOCUMENTS

| | | | |
|---|---|---|---|
| 1,525,126 | 2/1925 | Goldstein | 249/141 |
| 1,946,411 | 2/1934 | Roirant | 249/141 |
| 2,543,332 | 2/1951 | Olsen et al. | 249/137 X |
| 2,976,571 | 3/1961 | Moslo | 249/141 |
| 3,015,911 | 1/1962 | Payne | 249/141 X |
| 3,555,619 | 1/1971 | Bucy | 425/242 X |

Primary Examiner—Francis S. Husar
Assistant Examiner—William R. Briggs
Attorney, Agent, or Firm—William N. Hogg

[57] ABSTRACT

A mold for rotational casting of plastics is disclosed. The mold is formed in two mating sections with one section having a raised tongue and the other having a groove disposed to receive the tongue. The mold sections have flat faces fitting together in sealing engagement. A channel is formed in one of the flat faces around the tongue, and aperture means are provided to communicate the channel with the outside of the mold. Also, additional aperture means are provided to connect the groove with the outside of the mold. Thus, entrapped gases are preferentially vented to the outside of the mold rather than inwardly where they could deform cast parts.

5 Claims, 6 Drawing Figures

U.S. Patent    March 14, 1978    4,078,761
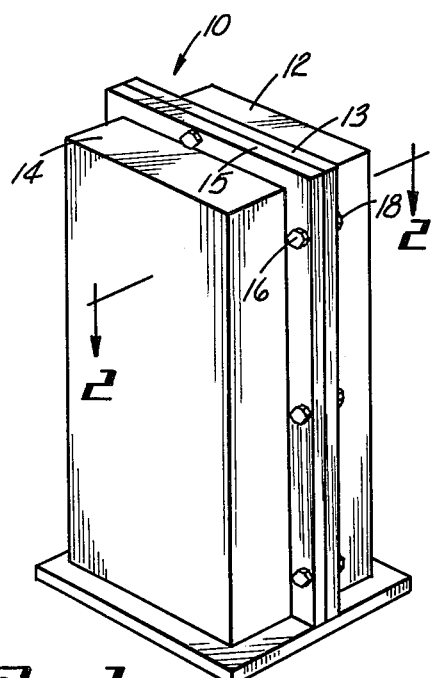
Fig.1
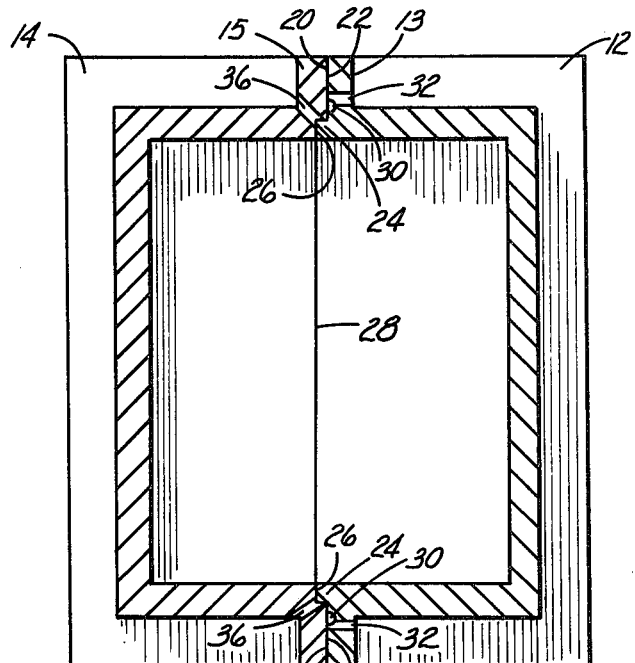
Fig.2
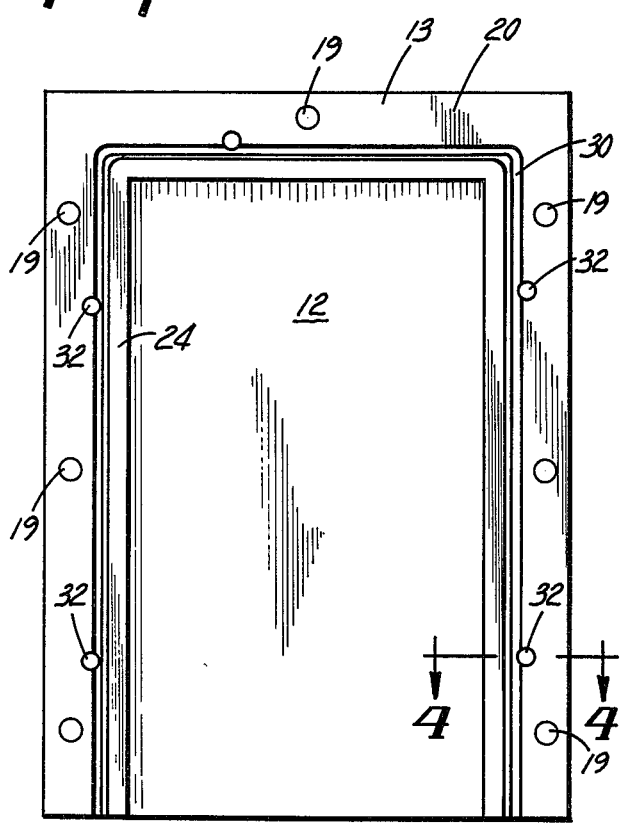
Fig.3
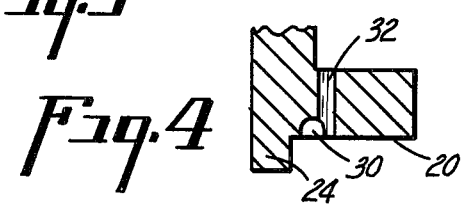
Fig.4
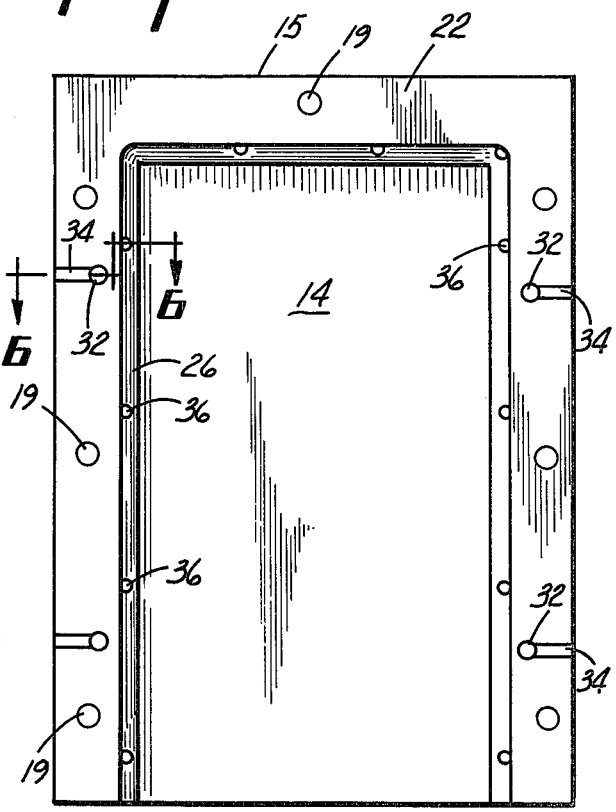
Fig.5
Fig.6

ROTATIONAL CASTING MOLD

BACKGROUND OF THE INVENTION

This invention relates to molds for rotational casting of plastic articles, and more particularly to such rotational casting molds having a construction to prevent damage to the molded product from gas trapped between the mold sections when they are joined.

One conventional technique of rotational casting is to provide two mating mold halves having flat faces which can be bolted or otherwise secured together to form a mold cavity. When the two halves are joined, what is known as a "parting line" is formed. This parting line is at the line of intersection between the two mold halves. Normally, immediately adjacent to the parting line are flat faces which abut and sealingly engage each other to maintain essentially a fluid tight interior within the mold cavity. A tongue and groove arrangement is provided in many cases to accurately align the two mold halves.

In the rotational casting process some type of end cover is provided, and the charge is introduced into the mold halves; thereafter the mold is rotated and heated. During this heating process, if there is any air trapped between the two faces, the heating thereof causes expansion of this air; also, expansion of the mold occurs. The expansion tends to drive the air out from between the sealing faces. Unfortunately, in many instances, the air is driven inwardly, rather than outwardly, which often results in a defect of the rotationally cast article formed within the mold along the parting line, which defect takes the form of a raised bubble either partially or entirely distorting the wall of the formed part, making it either of inferior quality or actually unuseable. Even providing very carefully machined and tight fitting sealing faces on the two mold halves does not completely eliminate this problem, and in many instances, it is a very serious problem causing a substantial amount ot scrap.

SUMMARY OF THE PRESENT INVENTION

According to the present invention, an improved mold for rotational casting of plastic is provided, wherein the mold is formed in two mating sections, with one section having a raised tongue and the other section having a groove disposed to receive this tongue. The mold sections each have flat faces disposed to sealingly engage each other, and means are provided to secure these sections together with the flat faces of each section in sealing engagement and with the tongue in the groove. Vent means are provided to permit the escape of the gases from between the sections when heating to the exterior of the mold, in preference to it going to the interior. The vent means include channel means formed in one of the flat faces surrounding the tongue with first aperture means extending from said channel means to the outside of the mold, and second aperture means connecting the groove with the outside of the mold, whereby during heating, any trapped air between the sealing faces will be vented to the exterior of the mold, in preference to escaping to the interior at the parting line.

DESCRIPTION OF THE DRAWING

FIG. 1 is a perspective view of the improved mold for rotational casting according to this invention, formed in two halves and bolted together;

FIG. 2 is a sectional view taken substantially along the plane designated by the line 2—2 of FIG. 1;

FIG. 3 is an interior plan view of one of the mold sections;

FIG. 4 is a sectional view taken substantially along the plane designated by the line 4—4 of FIG. 3;

FIG. 5 is an interior plan view of the other of the two mold sections; and

FIG. 6 is a sectional view taken substantially along the plane designated by the line 6—6 of FIG. 5.

DESCRIPTION OF THE PREFERRED EMBODIMENT

Referring now to the drawing, a mold for rotational casting of a plastic article according to this invention is shown and designated generally by the reference character 10. The mold 10 is formed in two mating sections, one section designated by the reference character 12, and having a flange 13; the other section being designated by the reference character 14, and having a flange 15. The two sections 12 and 14 are joined together by means of bolts 16 and nuts 18, passing through aligned apertures 19 formed in the flanges 13 and 15.

The flange 13 on the section 12 has a flat face 20 and the flange 15 on the section 14 has a flat face 22, which faces 20 and 22 are smooth faces, preferably machined to mate with each other in essentially fluid tight sealing engagement as shown in FIG. 2.

In order to properly align the two mold sections and to also provide additional sealing, the mold section 12 is provided with a tongue 24 which mates with a groove 26 formed in the mold section 14. As thus formed, when the molds are mated together as shown in FIGS. 1 and 2, a parting line 26 is formed in the interior cavity. As thus far described, the mold is essentially of conventional design.

The improvement of the present invention constitutes means for venting any gases trapped between the flat faces 20 and 22. This includes a channel 30 formed in the flat face 20 surrounding the tongue 24. This is a depression extending into the flange where it joins the main body of the section 12. Communicating with the channel 30 are a plurality of apertures 32 extending through the flange 13 to the exterior of the mold. Also, there are a plurality of slots 34, each slot communicating with each of the apertures 32. The slots 34 are formed in the flat face 22 of the flange 15 and extend essentially therealong to the outer edge of the flange 15. Thus, the channel 30, apertures 32 and slots 34 provide a venting system to pick up and exhaust trapped gases between the faces 20 and 22 to the exterior of the mold, in preference to allowing them to travel inwardly to the parting line 26 where they can damage the molded article at the parting line where it is formed, Additional vent means are also provided in the form of a second set of apertures 36 which are formed in the groove 26 and are drilled at an angle through the mold section 14 to the exterior. These allow for the venting of any gases trapped on the flat faces formed by the groove 26 and the end of the tongue 24.

Thus, according to the present invention, a mold cavity for rotational casting is provided, which has mating flat sealing faces in sealing engagement with each other, but which are provided with venting means to the exterior of the mold to allow for the venting of any air or other gases trapped between the flat faces thus eliminating potential damage to the molded article by the escape of trapped gases inwardly, rather than outwardly as is assured by the present invention.

I claim:

1. In a mold for rotational casting of plastic wherein said mold is formed in two mating sections with one section having a raised tongue and the other section having a groove disposed to received said tongue, and wherein said mold sections each have plural complementary face means disposed to sealingly engage each other, and means to secure said sections together with said complementary face means of each section in sealing engagement and with said tongue in said groove, the improvement comprising vent means to permit escape of gas from between the complementary faces of said sections during heating, so that said gas is vented to the exterior of the mold preferentially to escape of said gas to the interior of the mold, said vent means including, channel means formed in one of said complementary surrounding said tongue outside said tongue, first aperture means extending from said channel means to the outside of said mold, and second aperture means connecting said groove with the outside of said mold, said plural complementary face means being essentially free of passage from the groove to the mold cavity.

2. The invention as defined in claim 1 wherein said first aperture means includes slot means formed in one of said flat faces.

3. The invention as defined in claim 2 wherein said first aperture means includes through openings intersecting said channel means.

4. The invention as defined in claim 1 wherein said second aperture means includes through bore means intersecting said groove.

5. The invention as defined in claim 1 wherein said channel means is formed in the face of the member having the tongue.

* * * * *